US010021195B2

(12) United States Patent
Armstrong

(10) Patent No.: US 10,021,195 B2
(45) Date of Patent: *Jul. 10, 2018

(54) CROSS-DEVICE SYNCHRONIZATION SYSTEM FOR ACCOUNT-LEVEL INFORMATION

(71) Applicant: Amazon Technologies, Inc., Seattle, WA (US)

(72) Inventor: Patrick Joseph Armstrong, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,298

(22) Filed: Aug. 14, 2017

(65) Prior Publication Data

US 2018/0097893 A1    Apr. 5, 2018

Related U.S. Application Data

(63) Continuation of application No. 14/626,079, filed on Feb. 19, 2015, now Pat. No. 9,736,246.

(51) Int. Cl.
*H04L 29/06* (2006.01)
*H04L 29/08* (2006.01)

(52) U.S. Cl.
CPC ............ *H04L 67/146* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 6,567,848 B1 | 5/2003 | Kusuda et al. | |
| 6,606,644 B1 | 8/2003 | Ford et al. | |
| 6,785,726 B1* | 8/2004 | Freeman | G06F 9/542 709/227 |
| 8,046,823 B1* | 10/2011 | Begen | G06F 21/335 726/12 |
| 8,639,629 B1 | 1/2014 | Hoffman | |
| 8,782,755 B2* | 7/2014 | Harris | H04L 63/08 726/5 |
| 9,094,407 B1* | 7/2015 | Matthieu | H04L 63/10 |
| 2002/0046286 A1 | 4/2002 | Caldwell et al. | |
| 2003/0084306 A1* | 5/2003 | Abburi | G06F 21/10 713/188 |
| 2003/0110212 A1 | 6/2003 | Lewis | |

(Continued)

OTHER PUBLICATIONS

Tschaikowski, Max; Tribastone, Mirco. Generalized Communication for Interacting Agents. 2012 Ninth International Conference on Quantitative Evaluation of Systems (QEST). Pub. Date: 2012. http://ieeexplore.ieee.org/stamp/stamp.jsp?tp=&arnumber=6354646.*

(Continued)

*Primary Examiner* — Jeremiah Avery
(74) *Attorney, Agent, or Firm* — Knobbe, Martens, Olson & Bear, LLP

(57) ABSTRACT

Features are disclosed for synchronizing information across various devices, and using the synchronized information during subsequent content interactions. Devices may receive and/or store information, such as cookies or other account-level information, in connection with content interactions, such as content page retrieval, application execution, and the like. Information that is not device-specific can be synchronized across multiple devices, thus providing access to the information on any of the devices regardless of which device originally received or stored the information.

17 Claims, 6 Drawing Sheets

(56) References Cited

U.S. PATENT DOCUMENTS

| | | | |
|---|---|---|---|
| 2003/0131045 A1 | 7/2003 | McGee et al. | |
| 2004/0083391 A1* | 4/2004 | De Jong | G06F 21/10 |
| | | | 726/27 |
| 2010/0154041 A1* | 6/2010 | Dalzell | G06F 21/41 |
| | | | 726/6 |
| 2011/0083067 A1 | 4/2011 | Shim | |
| 2013/0227286 A1* | 8/2013 | Brisson | H04L 63/062 |
| | | | 713/168 |
| 2016/0044040 A1* | 2/2016 | Caffary, Jr. | G06F 21/6218 |
| | | | 726/4 |

OTHER PUBLICATIONS

Celesti, Antonio; Tusa, Francesco; Villari, Massimo; Puliafito, Antonio. How the Dataweb Can Support Cloud Federation: Service Representation and Secure Data Exchange. 2012 Second Symposium on Network Cloud Computing and Applicatioins (NCCA). Pub. Date: 2012. http://ieeexplore.ieee.org/stamp/stamp.jsp?tp=&arnumber=6472461.*

VanderMeer, Debra; Datta, Anindya; Duta, Kaushik;Ramamritham, Kriti; Navanthe, Shamkant. Mobile User Recovery in the Context of Internet Transactions. IEEE Transactions on Mobile Computing. vol. 2, Issue: 2. Pub. Date: 2003. http://ieeexplore.ieee.org/stamp/stamp.jsp?arnu mber=1217233 (of-record in parent application).

Gao, Haojiang; Xiao, Tianyuan. A Data Synchronization based Single Sign-on Schema Supporting Heterogeneous Systems and Multi-Management Mode. 3rd IEEE International Conference on Computer Science and Information Technology (ICCSIT), http://ieeexplore.ieee.org/stamp/stamp.jsp?arnumber=5565164 (of-record in parent application). Pub. Date: 2010.

\* cited by examiner

CROSS-DEVICE SYNCHRONIZATION SYSTEM FOR ACCOUNT-LEVEL INFORMATION

CROSS-REFERENCE TO RELATED APPLICATION

This application is a continuation of U.S. application Ser. No. 14/626,079, filed Feb. 19, 2015, now U.S. Pat. No. 9,736,246, which is incorporated by reference herein in its entirety.

BACKGROUND

Users often use client devices to request, receive and process content from content servers over networks (e.g., retrieving web pages from web sites via the Internet). Content servers can identify individual users and provide personalized content to the users. For example, users can set up accounts with the content servers. The users can then provide their account login credentials to the content servers before or in connection with content requests, and the content servers can provide personalized content, such as content tailored to the user's prior browsing history (e.g., if the content server is a news web site, new articles can be highlighted and articles that the user has previously read can be de-emphasized). However, this requires users to create accounts with each content server providing such personalized content, and users must typically log into the content servers periodically or during each browsing session. In addition, the content servers must maintain information regarding the user accounts.

As an alternative to storing account-level information on content servers and requiring users to create accounts with content servers, the content servers may store information (e.g., "cookies") on the client devices. The information may be stored on the client devices and provided back to the content servers with subsequent content requests so that the content servers can, e.g., identify the user and/or device. Thus, if the same user subsequently uses the same client device to request content from the same content server, the content server can identify the user and provide personalized or customized content without requiring the user to log into the content server.

BRIEF DESCRIPTION OF DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

DETAILED DESCRIPTION

Introduction

Figure 1:
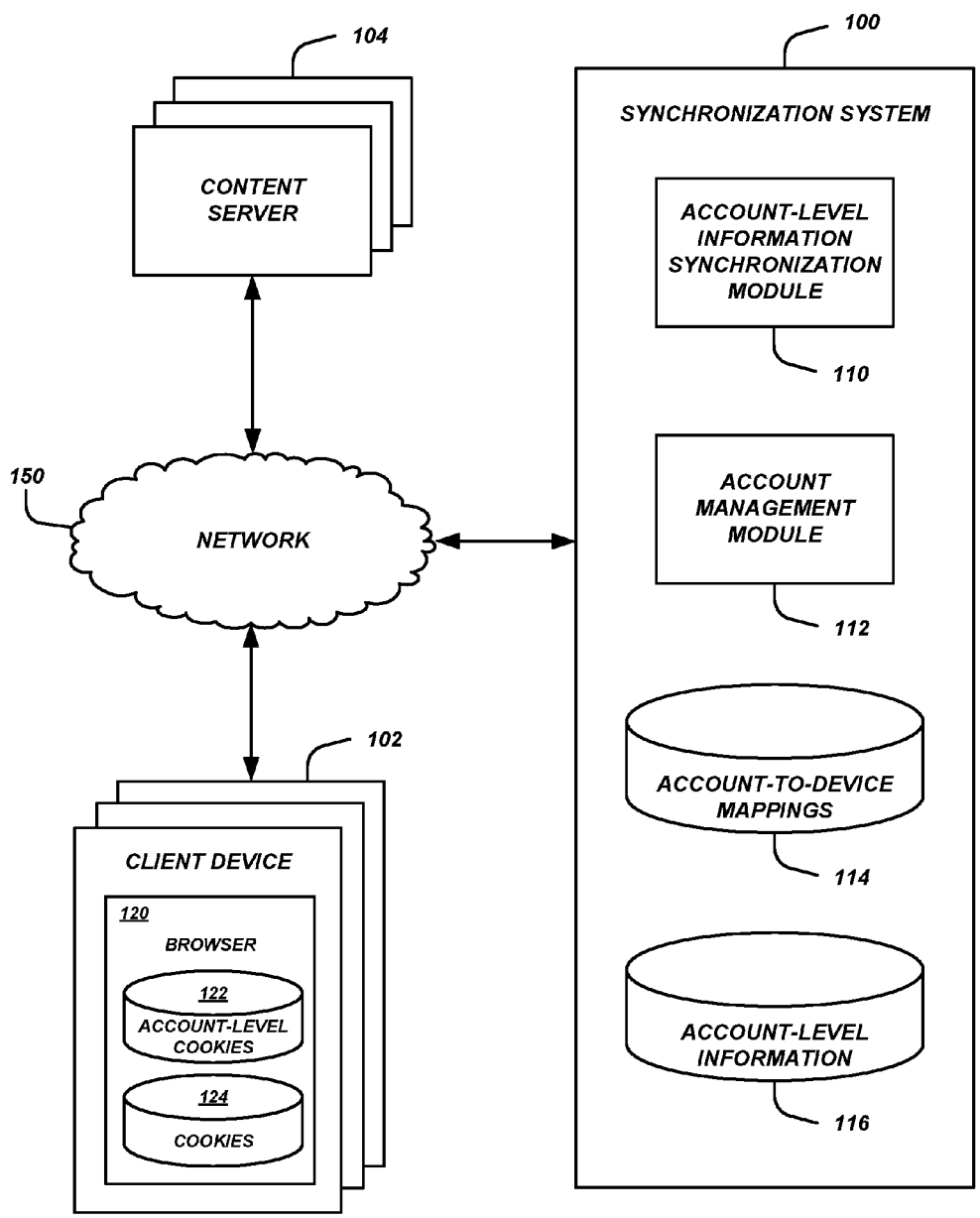
FIG. 1 is a block diagram of an illustrative network environment including an account-level information synchronization system, multiple user devices, and multiple content servers according to some embodiments.

The present disclosure is directed to a system that synchronizes, across multiple user computing devices, information that may be used to customize content, track interactions, and the like. The synchronized information may be referred to collectively as "account-level information," and includes information that is not necessarily tied to or otherwise associated with a specific device, but rather is device-independent information that is tied to or otherwise associated with a specific user, profile, or account. For example, account-level information may include information regarding the identity of the user or account, information regarding historical content interactions, and the like. Advantageously, instead of content servers storing such account-level information on the servers for each individual account, the information can be provided to individual user devices (e.g., as cookies) and a network-accessible synchronization system can manage synchronization of the information across the various devices associated with the account. For example, the synchronization system can ensure that account-level information for a particular content server and a particular account is synchronized among all of the client devices (or some subset thereof) associated with the account. In this way, different devices may be used to access content from a particular content server at different times, and the content server may access account-level information applicable to the user or account in general, rather than a specific device, regardless of the device to which the content server originally provided the account-level information for storage.

Some conventional content servers require users to log into the content servers in order to establish an account-level identity across multiple devices. However, in this scenario, the content servers must store account-level information at the content servers. When a content server provides customization services for a large number of users (e.g., thousands, millions, tens of millions, or more), managing server-side storage of account-level information can be burdensome. Some conventional content servers store information on individual client devices in the form of cookies (or other information in the form of "name=value" pairs), local storage files, and the like. The information can be provided back to the content servers with subsequent content requests so that the content servers can customize content, or the information can be accessed on the client devices (e.g., using executable scripts, applications, and the like). However, in this scenario, the information is tied to an individual device because it is provided to—and stored on—one device at a time. Thus, if a user subsequently uses a different device to access the content server for the first time (or at any time subsequent to accessing the content server on the previous device), the content server does not receive or otherwise have access to the information provided to the previous device.

Some aspects of the present disclosure relate to a network-accessible synchronization system that maintains account-level information across multiple devices for any number of separate content servers. A user may establish an account with the synchronization system, rather than separate accounts with each of multiple content servers. The user may associate multiple individual devices with the synchronization system account. When one of the devices receives account-level information from a content server, it can provide the account-level information to the synchronization system. The synchronization system can then distribute the account-level information to the other devices associated with the account. For example, when another device associated with the account subsequently begins a content browsing session, a browser application or some other module executing on the device can connect to the synchronization system and obtain any new or updated account-level information (e.g., cookies) associated with the account. Then, when the browser application requests content from the content server, the cookies (or other account-level information) may be provided to the content server even though the content server did not previously provide the cookies to that particular client device. In this way, a consistent degree of account-specific customization, interaction tracking, and the like can be achieved by content servers regardless of which devices are being used to request content from the content servers. Illustratively, the synchronization system and various content servers (e.g., web sites) may be separated from each other, such as controlled by different entities, members of different network domains, etc. In this way, the services provided by the synchronization system can be de-coupled from content servers such that when a user browses content from one device, the user may have a consistent experience based on prior content interactions performed on another device, even though the user may have never interacted with a content server using the current device, and without requiring a login to the content server. In contrast, without such a synchronization system, the provision and availability of cookies are generally dependent upon the hypertext transfer protocol ("HTTP"), in which cookies associated with a particular content server or domain are only received by a device if the device has established a connection to the server or domain.

Additional aspects of the present disclosure relate to various ways in which account-level information can be provided by content servers to client devices. In some embodiments, a special type of cookie may be used by content servers to provide account-level information to client devices. For example, a specific HTTP header, such as a "set-account-level-cookie" header that is separate from the standard "set-cookie" header, may be used to provide account-level information to client devices. The client devices can then easily identify account-level information, provide it to the synchronization system, etc. In additional embodiments, account-level information may be provided using existing protocols, such as by using the standard "cookie" and "set-cookie" headers in HTTP requests and responses. Account-level information may be identified using a naming convention, such as prefixing account-level cookie names with "account-level" or some other indicator (e.g., "set-cookie: account-level-cookie1=value1"). In further embodiments, account-level information may be automatically identified by detecting a signature of account-level information, rather than device-specific information. For example, an aggregated analysis may be performed by the synchronization system to identify which cookies contain account-level information rather than device-specific information. The browser applications or other client-side modules can then be configured to identify the account-level information, or the browser applications can provide all cookies to the synchronization system and the synchronization system can identify which ones are account-level cookies.

Although aspects of the embodiments described in the disclosure will focus, for the purpose of illustration, on specific examples of content and account-level information in the form of content pages (e.g., "web pages") and associated metadata (e.g., "cookies"), one skilled in the art will appreciate that the techniques disclosed herein may be applied to any number of services, process, or applications. In some embodiments, account-level information may be in the form of other types of information or files stored locally on the client devices, and/or the account-level information may be used by or in connection with executable programs (e.g., games or other applications) rather than content pages from content servers, etc. Various aspects of the disclosure will now be described with regard to certain examples and embodiments, which are intended to illustrate but not limit the disclosure.

Example Account-Level Information Synchronization Environment

FIG. 1 shows an example network environment in which features of the present disclosure can be implemented according to some embodiments. The example network environment includes an account-level information synchronization system 100 (also referred to herein simply as a "synchronization system" for convenience), user devices 102, and content servers 104 in communication via a communication network 150. The network 150 may be a publicly accessible network (such as the Internet) of linked networks, possibly operated by various distinct parties. In other embodiments, the network 150 may include a private network, personal area network, local area network, wide area network, cable network, satellite network, cellular telephone network, etc., or combination thereof, each with or without access to and/or from the Internet.

The synchronization system 100 can be a computing system configured to manage synchronization of account-level information across multiple user devices 102 associated with an account. As described in greater detail below, the identification of account-level information may be based on the manner in which it is provided to user devices 102 (e.g., in particular HTTP headers), on an analysis of the information itself or its effect on content display, and the like. Furthermore, the synchronization system may distribute the account-level information among the various user devices 102 associated with an account such that the information is available on each of those user devices 102, regardless of the specific user device 102 to which it was originally provided by a content server 104.

In some embodiments, the synchronization system 100 can be a server or group of servers that may be accessed via the network 150. The synchronization system 100 can include a number of components to provide various features described herein, such as a synchronization module 110 to obtain account-level information and distribute it among devices associated with a particular account, and an account management module 112 to configure accounts and determine which user devices 102 are associated with which accounts, which account-level information is associated with which content sever 104, etc. The synchronization system 100 may also include various data stores, such as an account information data store 114 to store information about accounts (e.g., device-to-account mapping and content-server-to-account mappings) and an account-level information data store 116 to store the account-level information obtained from individual user devices 102.

The synchronization system 100 may be a single computing device, or it may include multiple distinct computing devices, such as computer servers, logically or physically grouped together to collectively operate as a server system. The components of the synchronization system 100 can each be implemented as hardware, such as a server computing device, or as a combination of hardware and software. In addition, the components of the synchronization system 100 can be combined on one server computing device or separated individually or into groups on several server computing devices. In some embodiments, the synchronization system 100 may include additional or fewer components than illustrated in FIG. 1. In some embodiments, the features and services provided by the synchronization system 100 may be implemented as web services consumable via a communication network 150. In further embodiments, the synchronization system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The user computing devices 102 can correspond to a wide variety of computing devices, including desktop computing devices, laptop computing devices, terminal devices, mobile phones, tablet computing devices, media players, set-top boxes, televisions (e.g., smart TVs), wearable computing devices (e.g., smart watches, smart eyewear, etc.), and various other electronic computing devices and appliances having one or more computer processors, computer-readable memories, and network connections. As described in greater detail below, a user of a user computing device 102 may use a browser application 120 stored in a computer readable memory and executed by a computer processor to request, obtain, view, and interact with content such as content pages, multimedia presentations, images, videos, and other documents or files. The browser 120 may include or have access to a data store for account-level information, such as an account-level cookie jar 122 that stores account-level cookies on the user computing device 102. The browser 120 may also include or have access to a data store for other information received from or associated with content servers, such as a standard cookie jar 124 or some other local storage on the user computing device 102. Illustratively, a browser 120 may obtain content from a content server 104, either directly or via a proxy or other intermediary system. In addition, the browser 120 may provide account-level information, received from a content server 104 or generated in connection with content received from a content server 104 and stored in the account-level cookie jar 122, to the synchronization system 100. The browser 120 may also receive account-level information provided to the synchronization system 100 by other user devices 102 associated with the same account, and the browser 120 or some other module or component can manage storage of the account-level information in a local account-level information data store, such as the account-level cookie jar 122.

Individual content servers 104 can correspond to a logical association of one or more computing devices for hosting content and servicing requests for the hosted content over the network 110. For example, a content server 104 can include a web server component corresponding to one or more server computing devices for obtaining and processing requests for content items (such as content pages, multimedia presentations, or other documents or files). Illustratively, the requests may originate from a user device 102, or from a proxy server or other device or system. In addition, the content server 104 may generate account-level information and provide the information to user devices, use account-level information received from user devices to customize content or perform other operations, etc.

Synchronization of Account-Level Information

Figure 2:
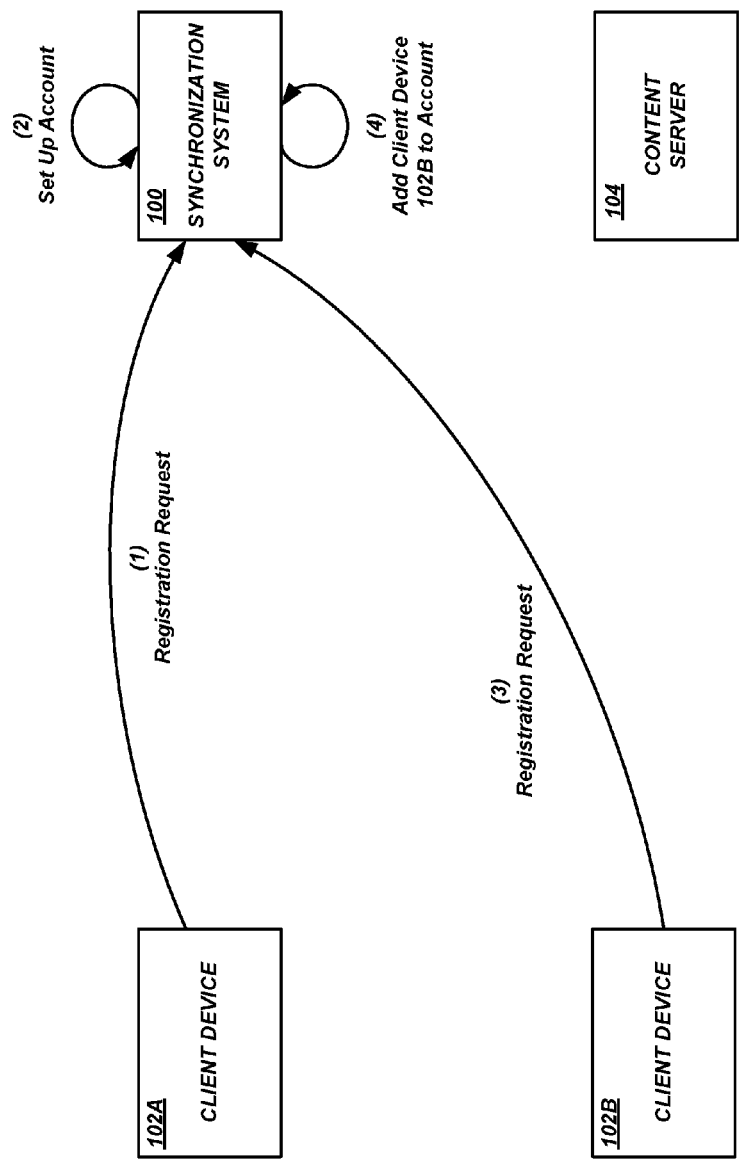
FIG. 2 is a block diagram of illustrative interactions and data flows between user devices and an account-level information synchronization system according to some embodiments.
Figure 3:
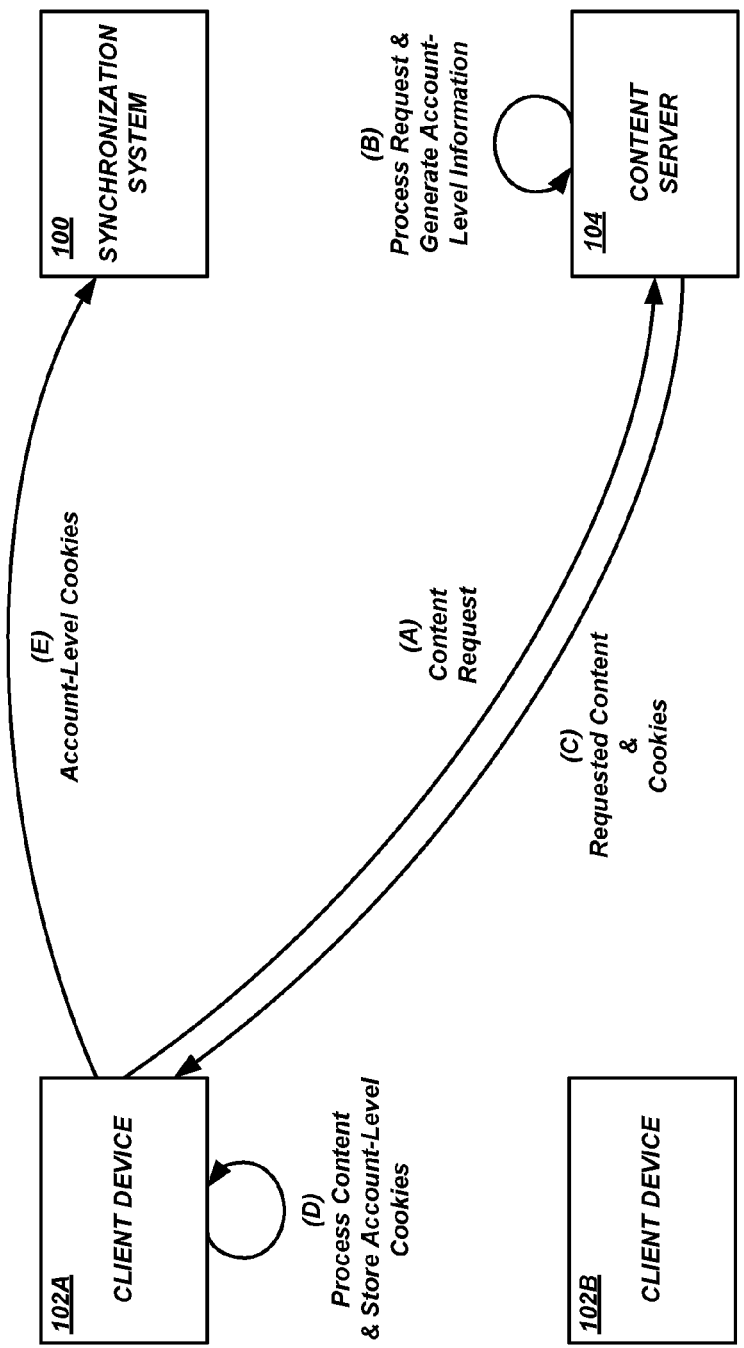
FIG. 3 is a block diagram of illustrative interactions and data flows between a user device, a content server, and an account-level information synchronization system according to some embodiments.
Figure 4:
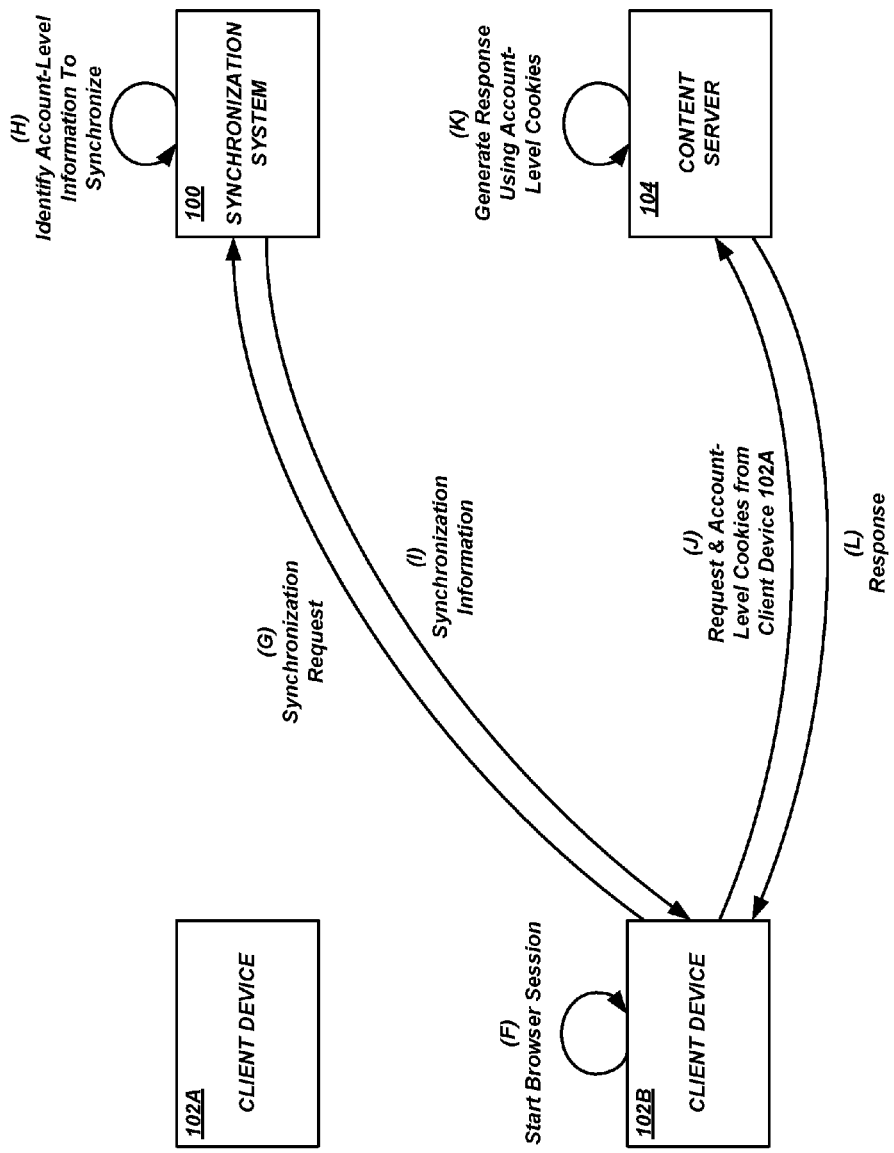
FIG. 4 is a block diagram of additional illustrative interactions and data flows between another user device, a content server, and an account-level information synchronization system according to some embodiments.

FIGS. 2, 3 and 4 show example interactions and data flows between two user devices 102A and 102B, a content server 104, and a synchronization system 100. Illustratively, the two user devices 102A and 102B may be associated with an account during a one-time or periodic account setup/registration procedure. Once the two user devices 102A and 102B are associated with an account, account level information provided by or otherwise associated with content server 104 may be synchronized between the devices 102A and 102B by the synchronization system 100.

As shown in FIG. 2, a user device 102A may register with the synchronization system 100 at (1). The user device 102A (or some component thereof, such as a browser module) may be configured to register with the synchronization system 100 automatically in response to some event, such as being powered on for the first time after purchase, upon initialization of a program for the first time after installation, etc. In some embodiments, a user may initiate a registration procedure, such as when the user decides to employ the services of a synchronization system 100 for device 102A (or program) that the user has already been using for some period of time. During the registration procedure, information about the device 102 (or some component thereof, such as a browser module) may be provided to the synchronization system 100 for registration. For example, a media access control ("MAC") address, an internet protocol ("IP") address, a serial number, an email address of the user, or some other identifying information can be provided to the synchronization system 100 for registration.

The synchronization system 100 may establish an account for the user at (2), such as if this is the first device that the user has registered with the synchronization system 100. Information about the user, the user device 102A, or the like can be used to establish an account that may be joined by other devices. As shown, a second user device 102B may subsequently register with the synchronization system 100 at (3). Because an account for the current user, users, or group of devices has been previously established, the second user device 102B can join the existing account with the synchronization system 100. At (4), the synchronization system 100 can store information about the second user device 102B that links it to the same account as the first user device 102A or otherwise groups it with user device 102A. For example, a user may be prompted to provide unique account identification credentials (e.g., email address, account number, etc.) in order to join the second device 102B to the same account as the first device 102A, rather than some other account or a new account. The synchronization system 100 can then link the devices 102A and 102B together such that account-level information provided to one of the devices 102A, 102B by a content server 104 can synchronized by the synchronization system 100 with the other device 102A or 102B.

In some embodiments, a user may set up an account and/or register user devices with an account from a single device, rather than requiring each individual device to perform a registration procedure with the synchronization system 100. For example, a user may establish an account with the synchronization system 100 by providing information about the various user devices 102 that will be part of the account. A user may provide such information manually (e.g., through an interface into which the user enters information about the user devices 102 or applications executing on the devices, such as the IP address, MAC address, serial number, or other identifier).

In the above-described embodiments and other examples, the user only sets up an account with the synchronization system 100, and the synchronization system 100 manages storage and synchronization of account-level information, associated with any number of different content servers 104, among the user devices 102 associated with the account. In some embodiments, the synchronization system 100 may operate transparently or invisibly to the content servers 104, such that no changes to preexisting content servers 104 are needed to obtain the benefit of account-level information synchronized across multiple user devices 102.

Although only two user devices 102A and 102B are shown and described, in some embodiments three or more user devices may be associated with a single account and may participate in the account-level information synchronization interactions and data flows described herein. In addition, although only one content server 104 is shown and described, in some embodiments any number of content servers 104 may provide, generate, or otherwise be associated with account-level information that is stored on the various user devices and synchronized among the various user devices by the synchronization system 100. Furthermore, although only one synchronization system 100 is shown and described, in some embodiments two or more synchronization systems may be used, or a single synchronization system 100 may include two or more separate points-of-presence ("POPs") for different geographic areas (e.g., data centers in different geographic locations). Illustratively, user devices 102 may connect to the synchronization system 100 or POP that is closest (in either a geographic or networking sense), rather than all user devices 102 connecting to a single synchronization system 100 or POP.

As shown in FIG. 3, a first user device 102A may request content from the content server 104 at (A). In some embodiments, a user may launch a browser application 120 on the user device 102A and request a content page hosted by the content server 104. The content server 104 may process the request at (B) and generate a response. The response may include the requested content page and associated metadata in the form of one or more cookies. For example, the response may be an HTTP response that includes markup code defining the requested content page, and also one or more HTTP headers to set cookies on the user device 102A. The cookies may include various types of information, such as temporary information, device-specific information, account-level information, and/or other information. Temporary information may be information that is only applicable—or is only to be used—during the current browsing session, and is therefore not to be stored in persistent storage on the user device 102A. Device-specific information may be information that is tied to or otherwise associated with the specific device 102A (e.g., display resolution, network connectivity, etc.), and therefore may not be appropriate to be distributed among other user devices associated with the same account. Account-specific information may be information that will be useful or applicable in subsequent browsing sessions, information that is associated with the user rather than the specific device, etc.

As shown, the content server 104 can provide a response, with account-level information, to the user device 102A at (C). In the present example, the content server 104 may generate account-level information to be provided to the user device 102A. The account-level information may include a unique identifier for the current account, information regarding the browse history of the account (e.g., an identifier of the requested content page), and/or other account-level information. Advantageously, the content server 104 may provide such account-level information to the user device 102A without requiring the user device 102A to log into the content server or even establish an account with the content server 104. Instead, the content server 104 can simply generate cookies or other information to be stored on the user device 102A for future access by the content server 104 (e.g., to be returned to the content server 104 with subsequent content requests, to be accessed by content provided by the content server 104 and executing on the user device 102A, etc.). In addition, because the account-level information may be provided in accordance with a predetermined account-level information protocol (e.g., using account-level-specific HTTP headers, account-level-specific naming conventions, etc.), the account-level information may be distributed to other user devices associated with the same account as the current user device 102A. The content server 104 may then access the account-level information in connection with future content requests or other interactions initiated by the current user, even if the user is using a different user device (e.g., user device 102B, as described in greater detail below). In this way, the features and functionality provided by cookies can be seamlessly extended to multiple devices without requiring the content server 104 to manage the synchronization of cookies across the multiple devices and without requiring the content server 104 to manage account logins and account information at the server.

The user device 102A can process the response at (D). In the present example, the response includes markup code defining the requested content page, and the browser 120 can process the markup code and render the content page according to standard protocols. In addition, the response includes account-level information, which may be in the form of one or more browser cookies. The user device 102A may identify and store the account-level information in the account-level information data store 122.

At (E), the user device 102A may provide the account-level information to the synchronization system 100. The user device 102A may provide account-level information to the synchronization system 100 on a predetermined or dynamically determined schedule (e.g., every 10 minutes, once per hour, once per day, etc.), in response to a request from the synchronization system 100, or in response to some other event. In some embodiments, the user device 102A may provide the account-level information to the synchronization system upon receipt (e.g., immediately upon receipt, during the next available period of idle network or processor activity, etc.). In additional embodiments, the user device 102A may provide account-level information to the synchronization system 100 at the end of the browsing session (e.g., when the browser application 120 is closed or is inactive for a threshold period of time) or at the beginning of a subsequent browsing session (e.g., upon browser initialization or when the browser becomes active again after a threshold period of time).

FIG. 4 shows illustrative data flows and interactions that may occur in connection with distribution of the account-level information received above to another user device 102B associated with the same account and the subsequent use of the account-level information by the user device 102B. At (F), a user (either the same user as described above, or potentially a different user altogether) may subsequently begin a browser session on another user device 102B associated with the same synchronization system 100 account. The browser application 120 (or some other component of the user device 102B) may send a synchronization request to the synchronization system 100 at (G). The synchronization request may be a request to receive any new or updated account-level information that the synchronization system 100 has for the account. In some embodiments, rather than sending a synchronization request to the synchronization system 100, the user device 102B may simply send a notification that a new browser session has been started, that the user device 102B is running, etc. The synchronization system 100 may then provide account-level information to the user device 102B. In other embodiments, the synchronization system 100 may provide account-level information to the user device 102B at the initiation of the synchronization system 100, without receiving any particular transmission from the user device 102B.

At (H), the synchronization system 100 can identify any account-level information to be provided to the user device 102B responsive to the synchronization request, notification, or other transmission (or at the initiation of the synchronization system 100). In some embodiments, the synchronization system 100 can determine which account-level information has been received from other user devices associated with the same account in the time since the synchronization system 100 last provided account-level information to this particular user device 102B. For example, each piece of account-level information may be stored in connection with a timestamp, version identifier, or the like, and the synchronization system 100 can determine which information has not be provided to the user device 102B using timestamps, version identifiers, or the like associated with account-level information on the user device 102B As another example, the entire set of account-level information associated with the account may be associated with a timestamp, version identifier, or the like, and the synchronization system 100 can determine whether the set of account-level information on the user device 102B (e.g., the account-level cookie jar 122) is up-to-date.

The synchronization system 100 can provide synchronization information to the user device 102B at (I). In some embodiments, the synchronization information may be only the information that is different or missing from the local data store on the user device 102B. In other embodiments, the synchronization information may be a partial or complete version of the set of account-level information for the account.

The user may initiate, on the user device 102B, a request for content from the content server 104 subsequent to receipt of the synchronization information. The user device 102B can send the content request to the content server 104 at (J), and also send cookies associated with the content server 104. In this example, the cookies sent to the content server 104 can include account-level cookies sent by the content server 104 to the user device 102A, described above. Thus, the content server 104 may have access to account-level information applicable to processing the current request, even though the account-level information was provided to a different device or otherwise generated in connection with interactions occurring with a different device. At (K), the content server 104 can generate a response using the account-level information generated and received as described above, and then provide the response to the user device 102B at (L). Illustratively, the response may reflect content interactions previously occurring on one or more other user devices associated with the account.

Example Process for Synchronizing Account-Level Information

Figure 5:
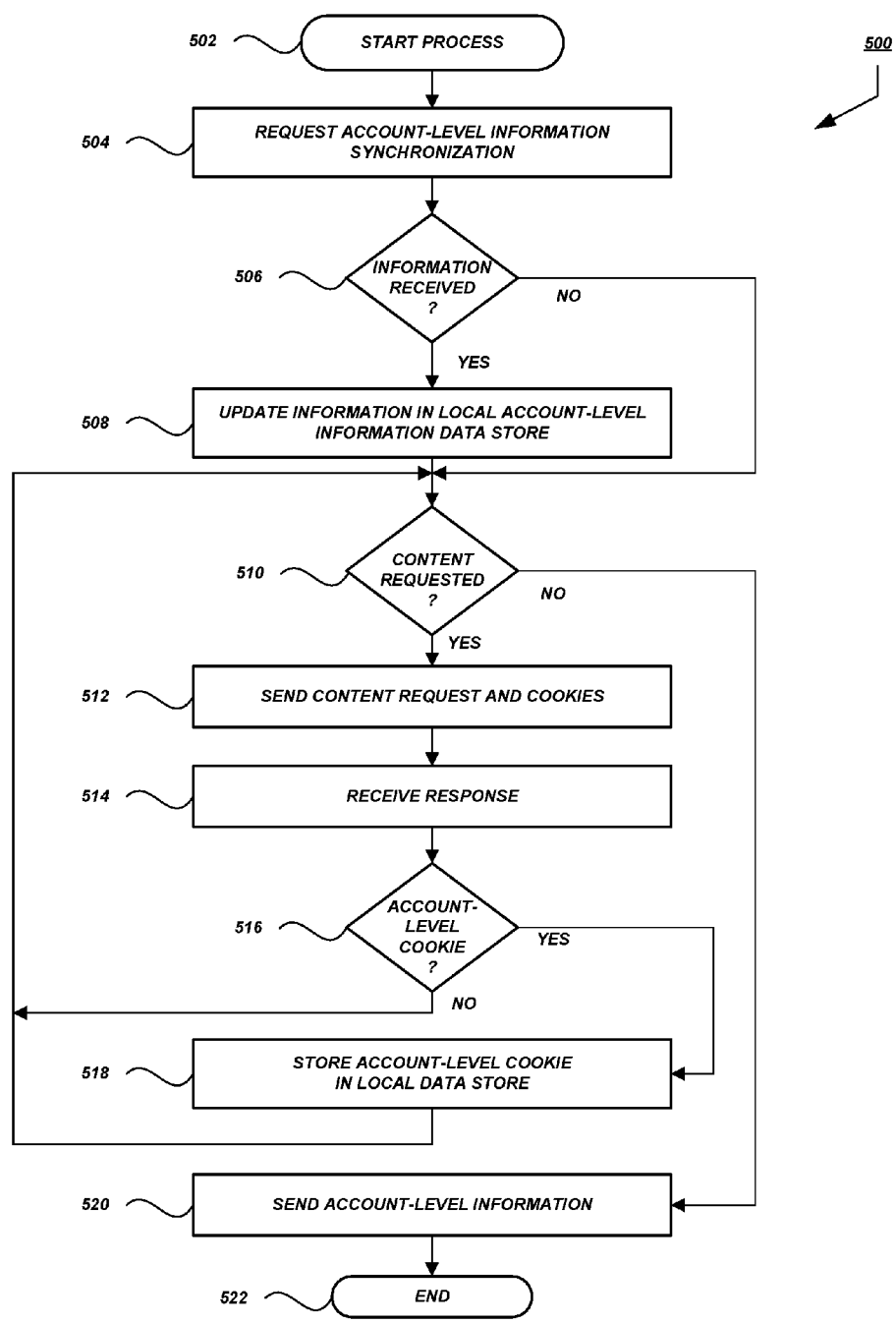
FIG. 5 is a flow diagram of an illustrative process for receiving, using, and maintaining account-level information according to some embodiments.

FIG. 5 illustrates a sample process 500 that may be used by a browser module (e.g., a browser application, a browser add-in or extension, etc.) to receive, provide, and otherwise use account-level information across multiple devices associated with an account. Advantageously, the information can be provided to, and received from, a network-accessible synchronization system 100 that manages the synchronization of account-level information across devices, thereby removing the account-level information management burden from users and content providers.

The process 500 will be described with respect to a browser module 120 that is configured to communicate with a synchronization system 100, such as a synchronization system 100 with which a user has established an account that includes multiple user devices 102. In some embodiments, the process 500 (or portions thereof) may be used to synchronize device-independent or other account-level information without using a browser application 120 (e.g., non-browser applications, such as music playback applications), to synchronize account-level information that is not in the form of cookies (e.g., files provided to, or generated by, client-side applications for local storage), etc. In some embodiments, functionality for identification and storage of account level information received from content servers 104 and synchronization systems 100 may be incorporated into a device operating system, add-in service, or the like.

The process 500 begins at block 402. For example, the process 500 may begin automatically upon initialization of the browser 120, on-demand in response to a request or command of a user or the synchronization system 100, or in response to some other event. For convenience, many portions of the process 500 will be described as initiated by or otherwise involving the browser 120. However, it will be appreciated that many of such operations can be initiated by or otherwise involve some other module or component of a user computing device 102.

At block 504, the browser 120 or some other module or component can request synchronization of account-level information from the synchronization system 100, as described above. At decision block 506, the browser 120 or some other module or component can determine whether information has been received. If so, the process 500 may proceed to block 508.

At block 508, the browser 120 or some other module or component can update the local account-level information data store 122 with information received from the synchronization system 100. In some embodiments, the information received from the synchronization system 100 may be encrypted, and the browser 120 can decrypt the information before storing it in the account-level information data store 122, or the browser may store the information in encrypted format. For example, browsers 120 may be configured to encrypt account-level information before providing it to the synchronization system 100, such that the information does not get stored or accessed by the synchronization system 100 in unencrypted format. In order to ensure that other user devices 102 associated with the account are able to decrypt the information, the synchronization system 100 (or some other system) may distribute encryption/decryption keys to the various devices of the account, and the synchronization system 100 (or other system) may retain a copy of the keys for backup purposes, to provide to new devices associated with the account, etc.

At decision block 510, the browser 120 or some other module or component can determine whether a content request has been initiated (e.g., via user entry of an address or selection of a link, via automated content retrieval processes, etc.). If so, the process 500 may proceed to block 512, where the browser 120 sends a content request to the appropriate content server 104. In addition, the browser 120 can send cookies associated with the content server 104 to the content server 104. In some cases, a cookie that was originally set on a different user device 102 may be sent to the content server 104 by the current user device 102 after the synchronization process described above.

At block 514, the browser 120 or some other module or component can receive a response to the request transmitted above. The response may include the requested content, and it may also include new or updated account-level cookies. At decision block 516, the browser 120 can determine whether any account-level cookies have been received.

Figure 6A:
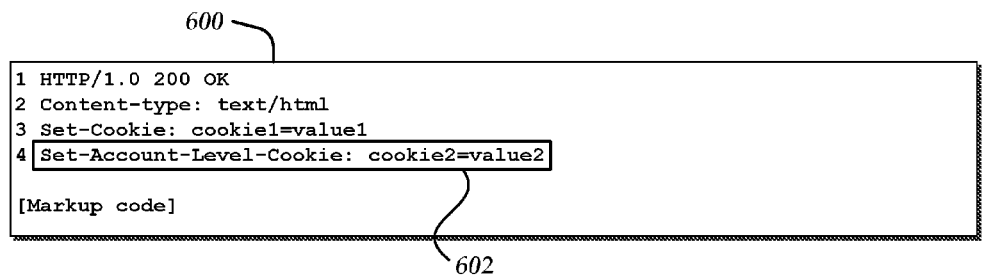
FIGS. 6A, 6B, and 6C show illustrative account-level information provided to user devices according to some embodiments.
Figure 6B:
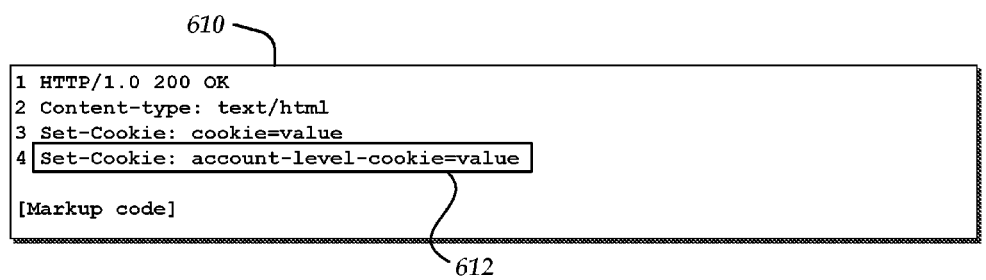
Figure 6C:
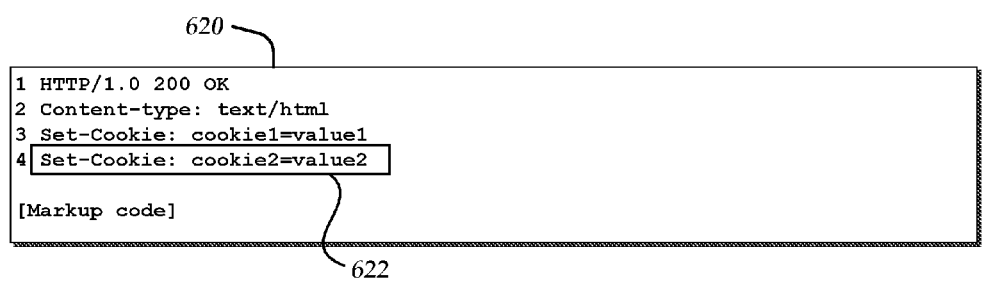

FIGS. 6A, 6B, and 6C show examples of different account-level cookies that may be received according to some embodiments. As shown, a response may be an HTTP response 600 that includes markup code defining the requested content, and various headers that include metadata and other information. One particular type of HTTP header is the "Set-cookie" header, shown at line 3 of the first example HTTP response 600. To facilitate the identification and separate processing of account-level cookies, a separate "Set-account-level-cookie" header 602 may be used, shown on line 4. In this way, a browser 120 may readily distinguish between account-level cookies and other cookies, and can then store only the account-level cookies in the account-level cookie jar 122 at block 518 and provide only the account-level cookies to the synchronization system 100 at block 520.

The second example HTTP response 610 includes two "Set-cookie" headers, shown at lines 3 and 4. The "Set-cookie" header at line 3 is a standard cookie, as described above. The "Set-cookie" header 612 at line 4, however, includes a cookie named using a naming convention that indicates its account-level nature (e.g., the "account-level" prefix). Thus, the browser 120 may readily distinguish cookies with account-level information from other cookies (e.g., temporary cookies, or cookies with device-specific information) even though only one type of cookie header is used.

The third example HTTP response 620 includes two "Set-cookie" headers, shown at lines 3 and 4. The "Set-cookie" header at line 3 is a standard cookie, as described above. The "Set-cookie" header 622 at line 4 also appears to be a standard cookie. However, a web browser 120 and/or synchronization system 100 may be configured to identify the account-level nature of the cookie based on an analysis of the cookie data, such as the name, the value, the content server 104 providing the cookie, the context, some combination thereof, etc. In some embodiments, heuristics may be used to determine whether a cookie is an account-level cookie or not. For example, cookies provided by various content servers 104 can be identified, and content from the content providers can be rendered with and without the cookies. Users, testers, system technicians, administrators, or the like can then determine whether the content is satisfactory on various user devices with or without individual cookies. Those cookies providing desired features or otherwise associated with satisfactory content across various devices can be identified as account-level cookies; cookies associated with unsatisfactory content performance on various devices may be identified as device-specific or otherwise not device-independent, etc.

Additional Embodiments

In some embodiments, the synchronization system 100 can analyze cookies or other account-level information. Based upon the results of the analysis, the synchronization system 100 can perform various procedures, such as modifying some cookies, propagating some cookies to devices outside of the current account, excluding some cookies from synchronization to other devices in the account, etc.

As one example, the synchronization system 100 may determine that all user devices 102 interacting with a particular content server 104 receive a particular cookie from the content server 104. The synchronization system 100 may then determine to provide the cookie to other user devices 102 proactively, even if/when no user device 102 of an account to which the other user devices 102 belong has visited the content server 104 or received the cookie. Alternatively or in addition, the synchronization system 100 may determine that certain user devices 102 receive a particular cookie from the content server 104, such as devices in a particular geographic region. The synchronization system 100 may then determine to proactively provide the cookie to only other devices 102 in the same geographic region, even if/when no user device 102 of an account to which the other devices 102 belong has visited the content server 104 or received the cookie.

As another example, the synchronization system 100 may determine whether a cookie is harmful or malicious (e.g., the cookie contains information that may violate a privacy policy, the cookie may be associated with a security weakness or other vulnerability, etc.). The synchronization system 100 may then determine to modify the cookie to mitigate the harm. Alternatively or in addition, the synchronization system 100 may determine to exclude the cookie from synchronization to other user devices 102 associated with the account, cause the cookie to be removed from the device 102 to which it was originally provided by a content server 104, etc.

In some embodiments, the synchronization system 100 may communicate with content servers 104 to determine whether updates to cookies should be applied, or whether new cookies should be provided to user devices 102 of a particular account, group of accounts, or all accounts. If an update is to be applied, the synchronization system 100 may update the cookie and provide the updated cookie to a user device 102 during the next synchronization procedure even if no user device 102 of the account has visited the content server 104 in the period of time since the prior version of the cookie was obtained. If a new cookie is to be provided, the synchronization system 100 may similarly provide the new cookie to a user device 102 during the next synchronization procedure. In this way, user devices 102 may receive updated/new cookies and obtain the benefit of those cookies the next time the user devices 102 interact with the content server 104, even if the content server 104 has never provided the updated and/or new cookie to any user device 102 associated with the account.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the process 500 described with respect to FIG. 5 may be embodied in a set of executable program instructions stored on one or more non-transitory computer-readable media, such as one or more disk drives or solid-state memory devices, of a computing system with which the synchronization system 100 is associated. When the process 500 is initiated, the executable program instructions can be loaded into memory, such as RAM, and executed by one or more processors of the computing system. In some embodiments, the computing system may include multiple computing devices, such as servers, and the processes or portions thereof may be executed by multiple servers, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A synchronization system, comprising:
a data repository that stores device mapping data for each of a plurality of accounts, wherein the device mapping data for a first of the plurality of accounts maps the first account to a plurality of user devices associated with the first account; and
a server system comprising one or more computing devices, the server system programmed to process a submission, from a user device, of a name=value pair received by the user device from a content server, by at least:
identifying an account associated with the user device;
identifying, based on the device mapping data associated with the account, a second user device associated with the account; and
transmitting the name=value pair to the second user device;
wherein the server system is separate from the content server and the first and second user devices, and the name=value pair contains account-level information used by the content server to provide customized content.

2. The synchronization system of claim 1, wherein the name=value pair is a cookie.

3. The synchronization system of claim 1, wherein the server system is programmed to transmit the name=value pair to the second user device in response to determining that the second user device has not yet received the name=value pair.

4. The synchronization system of claim 1, wherein the server system is further programmed to respond to the submission by storing, on the server system, a timestamped record of the submission.

5. The synchronization system of claim 1, further comprising a browser component that runs on the user devices and communicates with the server system, the browser component configured to generate said submission of the name=value pair.

6. The synchronization system of claim 5, wherein the browser component is configured to generate the submission in response to determining that the name=value pair contains account-level information.

7. The synchronization system of claim 5, wherein the browser component is configured to generate the submission in response to detecting that the name=value pair was received from the content server as part of an HTTP header designating the name=value pair as containing account-level information.

8. A non-transitory computer-readable memory that stores an executable browser component that directs a client device to implement a synchronization process that comprises:
receiving, from a content server, a content item having a header that includes a name=value pair, wherein the name=value pair is a cookie;
determining whether the name=value pair is an account-level name=value pair; and
in response to determining that the name=value pair is an account-level name=value pair, sending the name=value pair to a synchronization system that is configured to propagate the name=value pair to one or more other client devices that are associated with the client device, said synchronization system separate from the content server and the client device.

9. The non-transitory computer-readable medium of claim 8, wherein the process comprises using a name text string of the name=value pair to determine whether the name=value pair is an account-level name=value pair.

10. The non-transitory computer-readable medium of claim 8, wherein the process comprises using header text other than the name=value pair to determine whether the name=value pair is an account-level name=value pair.

11. The non-transitory computer-readable medium of claim 8, wherein the header is an HTTP header.

12. The non-transitory computer-readable medium of claim 8, wherein the process further comprises retrieving from the synchronization system and storing on the client device account-level name=value pairs submitted to the synchronization system by the one or more other client devices.

13. A synchronization system, comprising:
a browser component configured to run on multiple client devices of a user; and
a server system configured to communicate over a network with the browser component, the server system storing data that associates the multiple devices with an account of the user;
wherein the browser component, when running on a first of the multiple client devices, is responsive to receiving, from a content server separate from the server system, a content item header containing a name=value pair by sending the name=value pair to the server system, wherein the name=value pair includes account-level information used by the content server to generate customized content;
wherein the server system is configured to forward the name=value pair to at least a second client device of the multiple client devices in response to receiving a request from the second client device, said request generated by execution of the browser component on the second client device.

14. The synchronization system of claim 13, wherein the browser component, when running on the first client device, is configured to send the name=value pair to the server system in response to determining that the name=value pair is an account-level name=value pair.

15. The synchronization system of claim 14, wherein the browser component is configured to determine whether the name=value pair is an account-level name=value pair based on a name text string of the name=value pair.

16. The synchronization system of claim 14, wherein the browser component is configured to determine whether the name=value pair is an account-level name=value pair based on header text separate from the name=value pair.

17. The synchronization system of claim 13, wherein the server system is configured to forward the name=value pair to the second client device in response to determining that the second client device has not yet received the name=value pair.

* * * * *